United States Patent [19]

Kröck et al.

[11] 4,035,398

[45] July 12, 1977

[54] ANTHRAQUINONE DYESTUFFS

[75] Inventors: Friedrich Wilhelm Kröck, Leverkusen; Rudolf Braden, Odenthal-Scheuren; Rutger Neeff, Leverkusen; Volker Hederich, Cologne, all of Germany

[73] Assignee: Bayer Aktiengesellschaft, Leverkusen, Germany

[21] Appl. No.: 630,778

[22] Filed: Nov. 11, 1975

[30] Foreign Application Priority Data

Nov. 15, 1974 Germany .......................... 2454327

[51] Int. Cl.² ........................................ C09B 1/50
[52] U.S. Cl. ................................. 260/380; 8/39 R; 8/39 B; 8/39 C; 8/40
[58] Field of Search ...................... 260/380

[56] References Cited

U.S. PATENT DOCUMENTS 3,329,692  7/1967  Ramanathan .................... 260/380
3,538,129  11/1970  Sato et al. ..................... 260/380 X

*Primary Examiner*—Paul F. Shaver
*Attorney, Agent, or Firm*—Plumley and Tyner

[57] ABSTRACT

The invention relates to water-insoluble anthraquinone dye-stuffs of the formula

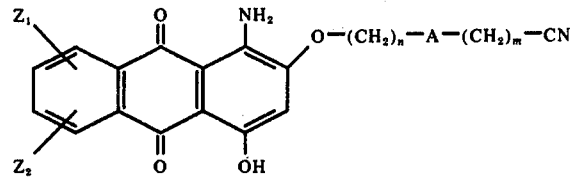

wherein
A denotes an optionally substituted cycloalkylene group,
n and m denote numbers from 0 to 4 and
$Z_1$ and $Z_2$ denote hydrogen or halogen.

The dyestuffs are outstandingly suitable for dyeing synthetic fibre materials, such as those made of cellulose esters, polyamides and polyurethanes and above all those made of aromatic polyesters, according to conventional dyeing processes.

10 Claims, No Drawings

ANTHRAQUINONE DYESTUFFS

The present invention relates to new anthraquinone dyestuffs, which are insoluble in water, of the formula

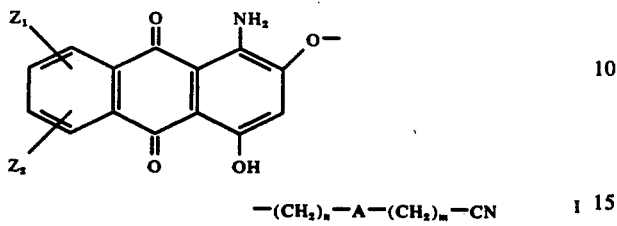

wherein
- A denotes an optionally substituted cycloalkylene group,
- $n$ and $m$ denote numbers from 0 to 4 and
- $Z_1$ and $Z_2$ denote hydrogen or halogen, and to their preparation and use for dyeing and printing synthetic fibre materials and for bulk dyeing thermoplastics.

Suitable radicals A are 5-membered to 14-membered monocyclic to tetracyclic cycloalkylene groups.
Examples which may be mentioned are:

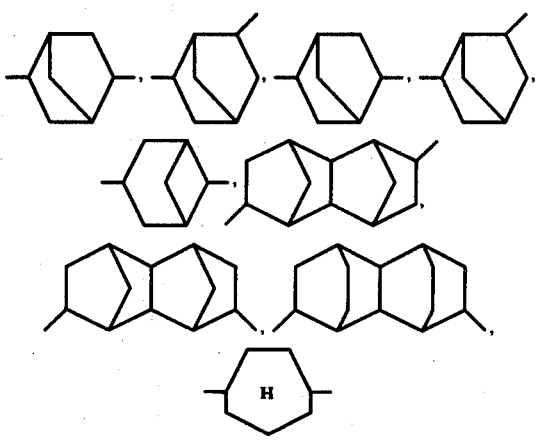

The radicals A can be monosubstituted to trisubstituted, for example by $C_1$ to $C_3$-alkyl, chlorine or cyano.

Preferred radicals A are 5-membered and 6-membered rings as well as 7-membered and 8-membered bicyclic structures.

Suitable halogen atoms $Z_1$ and $Z_2$ are fluorine and, above all, chlorine. Preferably, however, $Z_1$ and $Z_2$ represent hydrogen.

The numbers $n$ and $m$ independently of one another preferably represent 1 or 2.

Particularly preferred dyestuffs are those of the formula I in which the group $-(CH_2)_n$-A-$(CH_2)_m-$ denotes a group of the formula

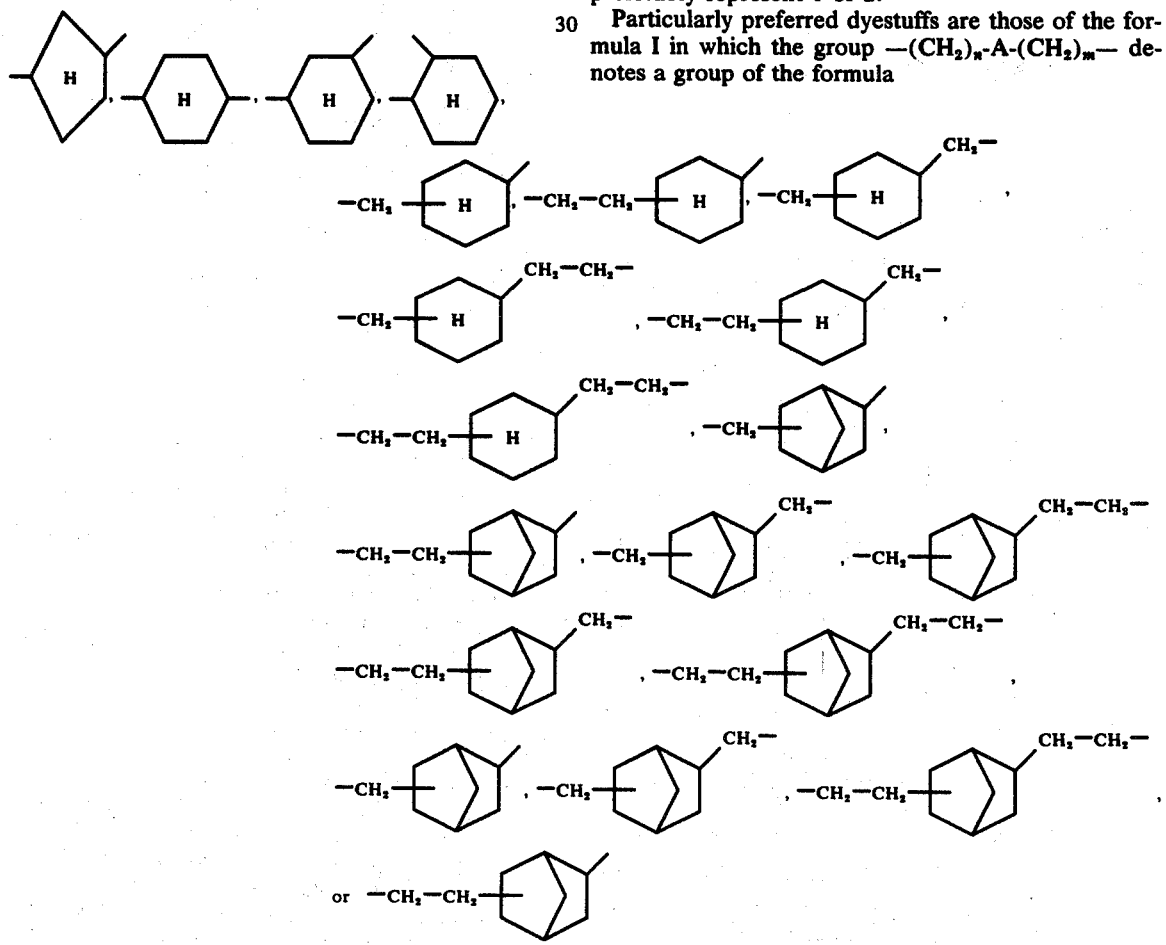

which optionally can carry yet further non-ionic radicals, such as, for example, $C_1$ to $C_3$-alkyl groups and/or cyano groups.

Amongst these, those dyestuffs of the formula I in which the group —(CH$_2$)$_n$-A-(CH$_2$)$_m$— denotes a group of the formula

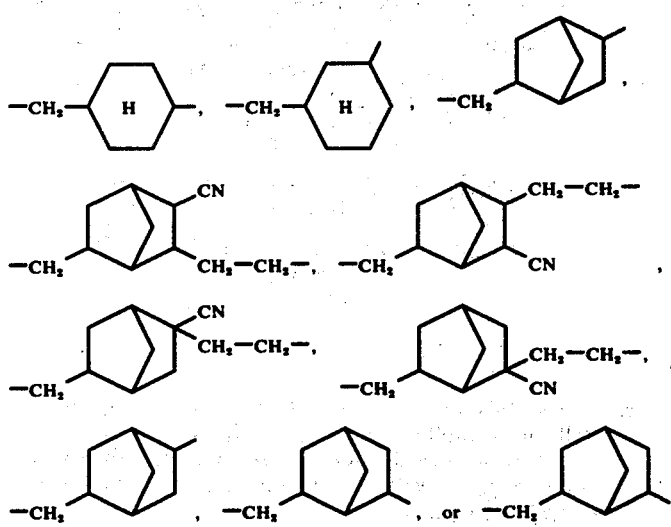

are very particularly preferred.

The dyestuffs are prepared in a manner which is in itself known by reacting compounds of the formula

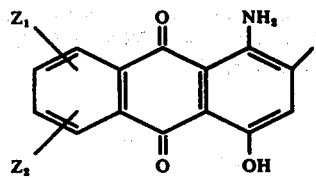

wherein
Z$_1$ and Z$_2$ have the abovementioned meaning and
E represents a substituent, which can be exchanged, with compounds of the formula

  HO-(CH$_2$)$_n$-A-(CH$_2$)$_m$-CN    III wherein
A, n and m have the abovementioned meaning, at elevated temperatures in the presence of basic compounds and optionally in the presence of an organic solvent.

In principle, the reaction of II with III can be carried out without the aid of solvents. However, if appropriate, the reaction is carried out in the presence of an organic solvent which is inert under the reaction conditions, the reactant III being employed in at least the equivalent amount.

In some cases it is also advisable to carry out the reaction in an excess of III, which then simultaneously serves as the solvent.

Examples of suitable organic solvents are: dimethylformamide, dimethylacetamide, dimethylsufphoxide, pyrrolidone-(2), N-methylpyrrolidone-(2), ), ε-caprolactam, tetramethylurea, hexamethylphosphoric acid triamide, pyridine and tetramethylenesulphone (sulpholane).

The reaction temperatures can be varied within a relatively wide range. In general, the reaction is carried out at 80°–180° C, preferably at 120°–160° C.

Suitable alkaline compounds are inorganic bases, such as, for example, oxides or hydroxides of alkali metals or alkaline earth metals, such as sodium hydroxide, potassium hydroxide or calcium oxide, alkali metal salts of weak acids, such as sodium carbonate, potassium carbonate, sodium acetate or potassium acetate, or organic bases, such as, for example, trimethylamine, triethylamine or benzyltrimethylammonium hydroxide.

Possible substituents E, which can be exchanged, are in particular: halogen, such as chlorine and bromine, lower alkoxy groups, especially the methoxy group, optionally substituted aryloxy groups, preferably phenoxy groups, or sulphonic acid groups.

Examples of suitable anthraquinone compounds II are: 1-amino-4-hydroxy-2-phenoxy-anthraquinone, 1-amino-4-hydroxy-2-(4-chloro-phenoxy)-anthraquinone, 1-amino-4-hydroxy-2-methoxy-anthraquinone, 1-amino-4-hydroxy-2-bromo-anthraquinone, 1-amino-4-hydroxy-2-chloro-anthraquinone, 1-amino-4-hydroxy-anthraquinone-2-sulphonic acid and 5-chloro-, 6-chloro-, 7-chloro-, 8-chloro-, 6,7-dichloro-, 6-fluoro-. 7-fluoro- and 6,7-difluoro-1-amino-4-hydroxy-2-phenoxy-anthraquinone.

The dyestuffs I can also be prepared by, for example, first preparing 1-amino-2-phenoxy-4-hydroxy-anthraquinone, described as the anthraquinone compound II, from 1-amino-2-chloro-4-hydroxy-anthraquinone or 1-amino-2-bromo-4-hydroxy-anthraquinone and phenol, which for this purpose is preferably employed in an equivalent amount, in the presence of basic compounds and optionally in the presence of an organic solvent at elevated temperatures in the manner known from the literature, and reacting this, without intermediate isolation, with the alcohols III, in the presence of basic compounds and optionally in the presence of an organic solvent, at elevated temperatures as described above to give the desired dyestuff. The procedure can also be such that the 1-amino-2-chloro-4-hydroxy-anthraquinone or 1-amino-2-bromo-4-hydroxy-anthraquinone is made to react with the alcohols III, in the presence of basic compounds and optionally in the presence of an organic solvent, with the addition of phenol. In this case, 1-amino-2-phenoxy-4-hydroxy-anthraquinone is produced direct in the reaction mixture and is immediately further reacted, phenol being liberated. Although phenol is already effective in a catalytic amount, the best results are observed when phenol is employed in an equivalent amount. In this way, in the reaction of 1-amino-2-chloro-4-hydroxyanthraquinone or 1-amino-2-bromo-4-hydroxyanthraquinone with the alcohols III, the reaction is considerably accelerated and the formation of by-products is reduced.

Some of the hydroxynitriles of the formula III are known or can be prepared according to known processes (compare, for example, U.S. Pat. No. Specification 3,127,727 and U.S. Patent Specification 3,492,330).

Examples of suitable compounds of the formula III are:

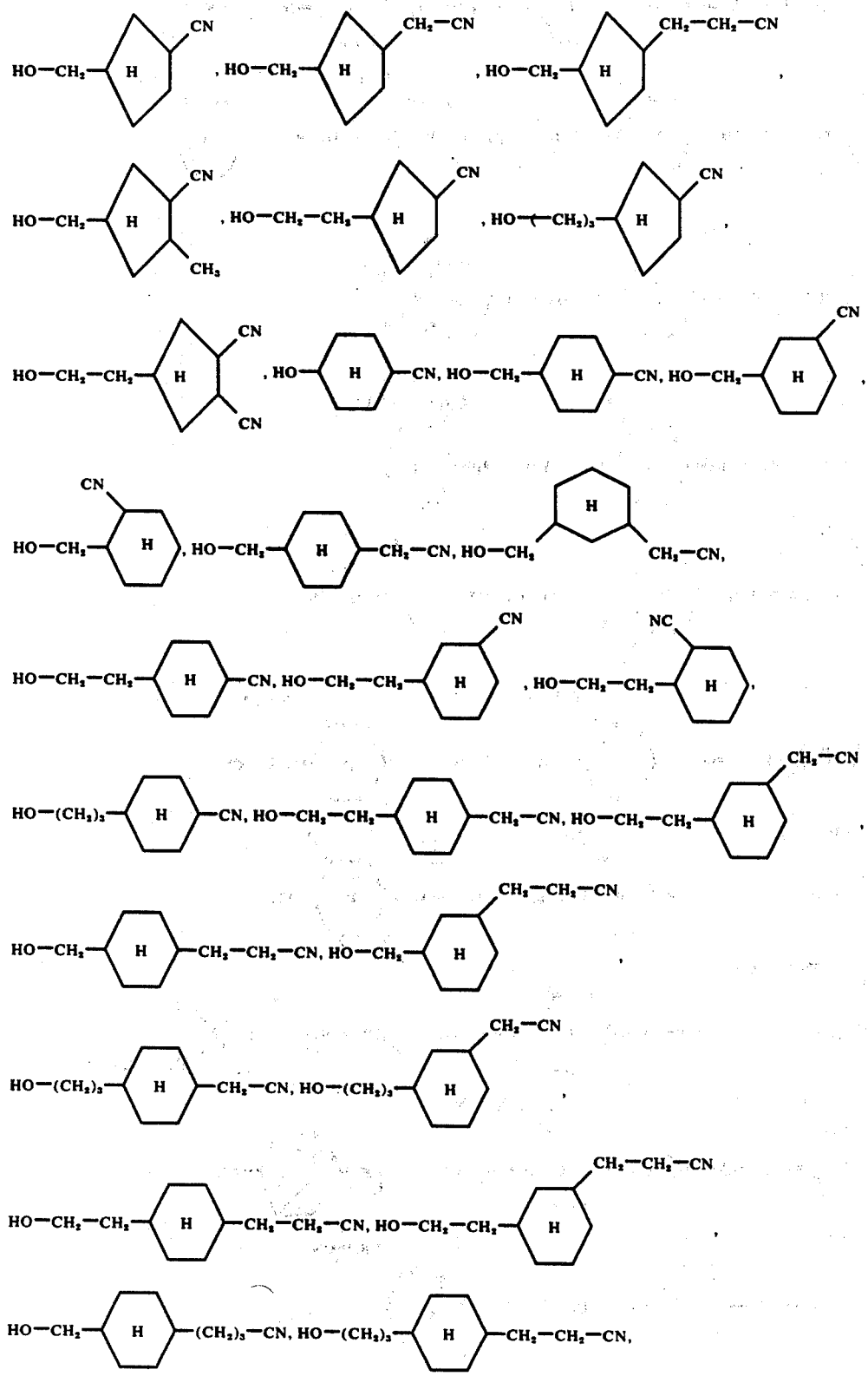

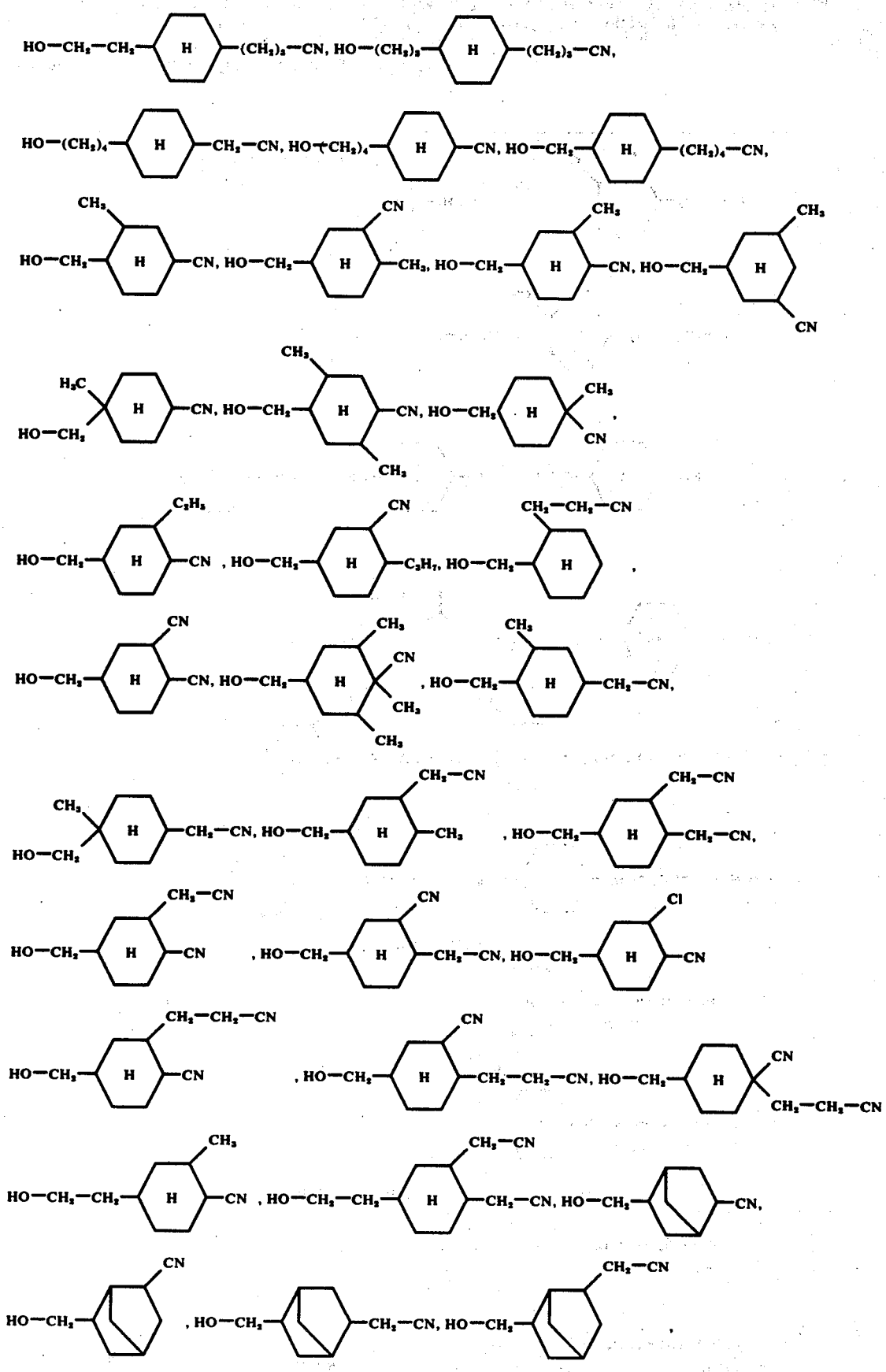

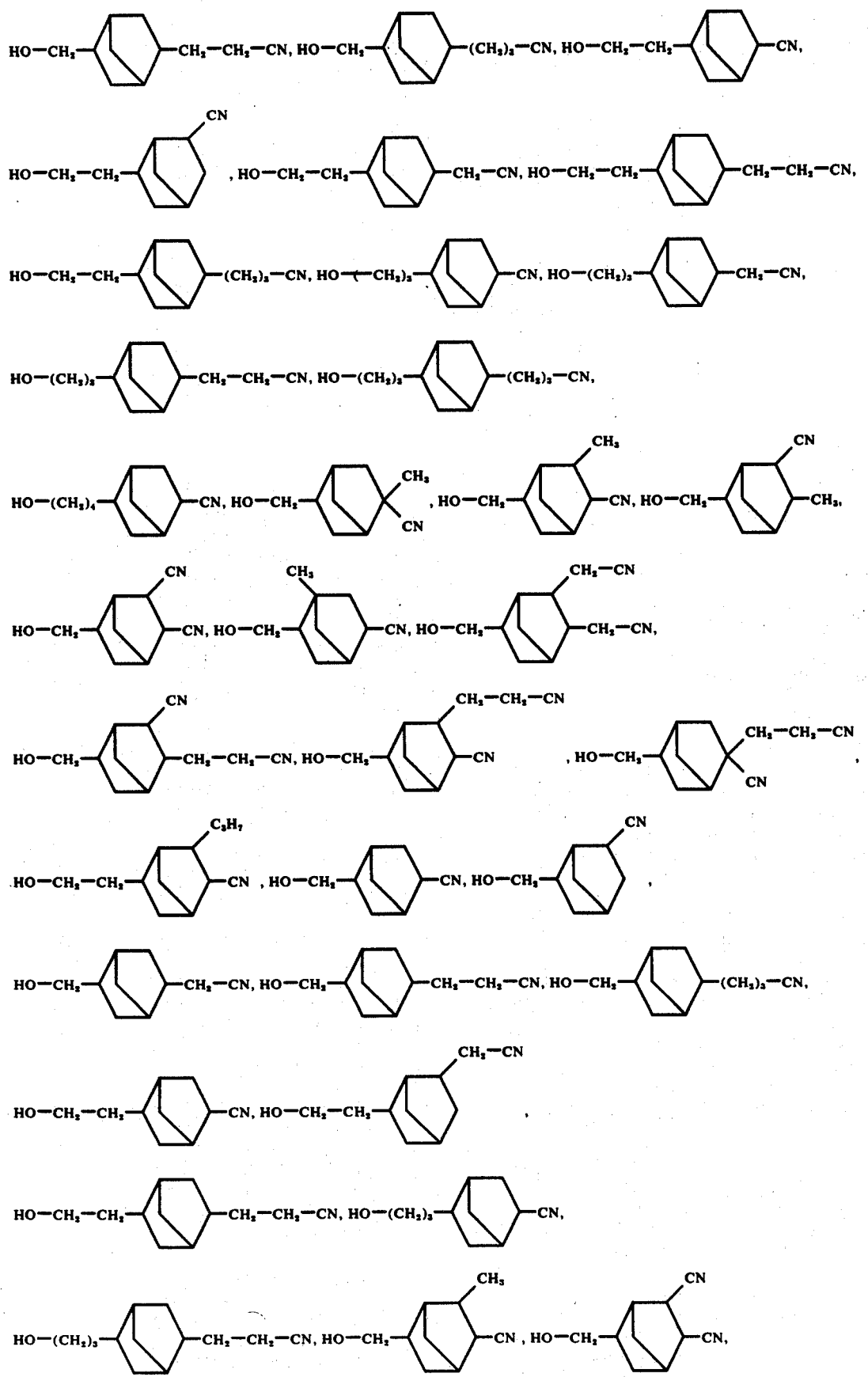

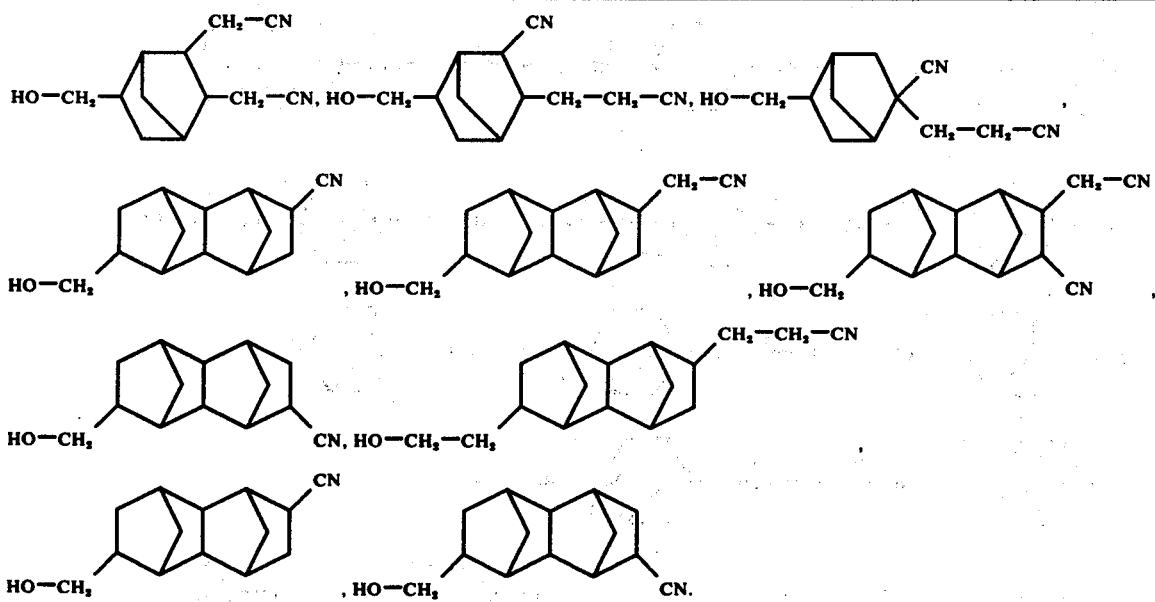

Another process for the preparation of the new dyestuffs I is to react compounds of the formula

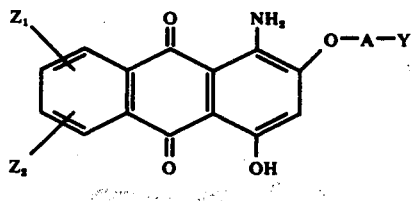

wherein

A, $Z_1$ and $Z_2$ have the abovementioned meaning and Y represents a substituent which can be exchanged by the CN group, in a manner which is in itself known with a metal cyanide in the presence of an organic solvent at elevated temperature.

Examples of suitable organic solvents are the N,N-dialkylamides of lower aliphatic carboxylic acids or cyclic lactams, such as N,N-dimethylformamide, N,N-diethylformamide, N,N-dimethylacetamide, N,N-dipropylacetamide, N,N-dimethylpropionamide, N,N-dipropylpropionamide, N-methylpyrrolidone and N-methyl-ε-caprolactam, tetraakylureas, such as tetramethylurea, hexaalkylphosphoric acid triamides, such as hexamethylphosphoric acid triamide, dialkylsulphones or dialkylsulphoxides, such as dimethylsulphoxide or dimethylsulphone, tetramethylenesulphone (sulpholane), lower monohydric alcohols, such as ethanol, propanol, butanol, pentanol and cyclohexanol, diols, such as ethylene glycol, diethylene glycol, triethylene glycol, 1,2-propylene glycol, propane-1,3-diol, butane-1,4-diol and hexane-1,6-diol; polyethylene glycols, polypropylene glycols, the monoethyl ethers, monomethyl ethers, monopropyl ethers or monobutyl ethers of ethylene glycol or of diethylene glycol, diethylene glycol dimethyl ether and ketones, such as acetone and methyl ethyl ketone, or mixtures thereof.

Amongst the solvents mentioned, N,N-dimethylformamide, N,N-dimethylacetamide, N-methylpyrrolidone, dimethylsulphoxide, tetramethylenesulphone, glycol monomethyl ether, ethylene glycol, diethylene glycol and triethylene glycol, diglycol dimethyl ether and mixtures thereof are preferably used.

The reaction temperatures can be varied within a relatively wide range, depending on the reactivity. In general, the reaction is carried out at 20° to 180° C, preferably at 80° to 150° C.

Examples of suitable metal cyanides are sodium cyanide, potassium cyanide, copper-I cyanide and zinc cyanide. The amount of cyanide is appropriately 1 to 1.5 mols per mol of compound IV.

In the case of compounds IV which are less reactive, the reaction can be accelerated by adding alkali metal iodides.

Possible substituents Y, which can be exchanged, are in particular: halogen, such as chlorine and bromine, and the optionally substituted benzenesulphonate group, preferably the tosyl group.

Suitable anthraquinone compounds IV, for example, are described in U.S. Patent Specification No. 2,992,240 and in British Patent Specifications No. 870,948 and 1,195,151 or are accessible analogously.

The new dyestuffs of the formula I as well as mixtures thereof with one another and mixtures with suitable known dye-stuffs are outstandingly suitable for dyeing synthetic fibre materials, such as those made of cellulose esters, polyamides and polyurethanes and above all those made of aromatic polyesters, according to conventional dyeing processes.

The dyeing or printing can be carried out according to processes which are in themselves known for dyeing from an aqueous liquor, both with the pure dyestuffs and with mixtures of two or more dyestuffs. It is advantageous to bring the dyestuffs or the dyestuff mixtures into a finely divided state before they are used according to the customary methods.

Moreover, the new dyestuffs are suitable for dyeing the types of fibre mentioned from organic solvents which are immiscible with water according to the exhaustive process, as is described, for example, in British Patent No. 1,314,022 and 1,284,670 (= U.S. Pat. No. 3,792,971). The preferred solvent is tetrachloroethylene. The dye liquors can optionally contain 0.5-3% of water and/or 0.05-2% by weight of a suitable non-ionic dispersing agent. With this dyeing method, the dyestuffs are appropriately employed in the form of preparations, such as are described in British Patent No. 1,341,954.

Dyeing is preferably carried out at the boiling point of the solvent in closed apparatuses.

Furthermore, the new dyestuffs are outstandingly suitable for dyeing mixed fabrics made of synthetic and natural fibre materials, preferably those made of polyester and cellulose (especially cotton).

The new dyestuffs, which are insoluble in water, can also be used for spin dyeing polyamides, polyesters and polyolefines. The polymer to be dyed, appropriately in the form of powders, granules or chips, as a ready-to-use spinning solution or in the molten state, is mixed with the dyestuff, which is introduced in the dry state or in the form of a dispersion or solution in a solvent, which optionally is volatile. After homogeneous distribution of the dyestuff in the solution or melt of the polymer, the mixture is processed in a known manner by casting, pressing or extruding to give fibres, yarns, monofilaments, films and the like.

The dyeings produced on the types of fibre mentioned are distinguished by good general fastness properties, in particular good to very good fastness to sublimation and high fastness to light.

EXAMPLE 1

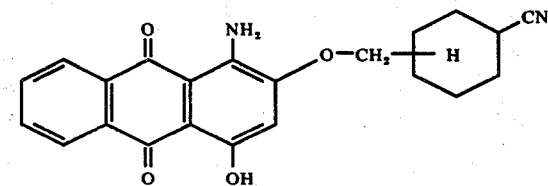

a. 27.8 g of a mixture of 3- and 4-hydroxymethyl-hexahydrobenzonitrile, such as is obtained by the hydroformylation of 1-cyano-cyclohex-3-ene, for example according to the instruction in U.S. Pat. No. 3,137,727 (1.7.1960), Example 5, and 22.6 g of ε-caprolactam are warmed to give a clear melt and 8.3 g of 1-amino-2-phenoxy-4-hydroxy-anthraquinone and 2.6 g of potassium carbonate are added. The mixture is heated for 5 hours at 140° C, whilst stirring, until no further starting material is detectable by thin layer chromatography (about 5 hours) and is then diluted, at 60°-70° C, with 50 ml of methanol. The red compound which crystallises out is filtered off, washed with methanol and water and dried.

Yield: 8.4 g, corresponding to 89% of theory.

The dyestuff is also obtained in good yield when sodium hydroxide or potassium hydroxide, sodium carbonate, sodium acetate or potassium acetate, calcium oxide or an organic base, such as, for example, triethylamine, trimethylamine or benzyltrimethylammonium hydroxide, is used as the condensing agent in place of potassium carbonate.

b. If, in Example 1a), 14.6 g of N,N-dimethylformamide or 20.2 g of N,N-dimethylacetamide are used in place of ε-caprolactam, the dyestuff is obtained in similarly good yield and purity in about the same reaction time.

c. The same substance is obtained in similarly good yield and purity when 6.8 g of 1-amino-2-methoxy-4-hydroxy-anthraquinone or 9.2 g of 1-amino-2-(4-chloro-phenoxy)-4-hydroxy-anthraquinone are employed in place of 8.3 g of 1-amino-2 -phenoxy-4-hydroxy-anthraquinone.

d. The same dyestuff is obtained when 6.9 g of 1-amino-2-chloro -4-hydroxy-anthraquinone or 8.0 g of 1-amino-2-bromo-4-hydroxy-anthraquinone are used in place of 8.3 g of 1-amino-2-phenoxy-4-hydroxy-anthraquinone.

These reactions proceed more smoothly when phenol is added to the reaction mixture: 27.3 g of 1-amino-2-chloro-4-hydroxy-anthraquinone are introduced into a mixture, warmed to 125° C, consisting of 110 g of a mixture of 3- and 4-hydroxy-methyl-hexahydrobenzonitrile and 55 g of N-methylpyrrolidone, 9.4 g of phenol and 12 g of anhydrous potassium carbonate, whilst stirring. Whilst passing nitrogen over the mixture, the latter is heated to 125°-126° C until no further starting material is detectable by thin layer chromatography. After cooling to 90° C, the reaction mixture is diluted with 150 g of methanol and cooled to room temperature. The reaction product which has precipitated is filtered off and washed with methanol and water. The same dyestuff as in Example 1a) is obtained in a yield of 31.2 g, corresponding to 83% of theory.

e. 3.4 g of potassium hydroxide are dissolved in 150 g of a mixture of 3- and 4-hydroxymethyl-hexahydrobenzonitrile the solution is heated to 120° C and the water is removed by passing dry nitrogen over the mixture. 10.2 g of 1-amino-4-hydroxy-anthraquinone-2-sulphonic acid are then added and the mixture is heated at 110°-115° C, whilst stirring, until a sample is insoluble in cold acidified water. After cooling to 100° C, the mixture is poured into 400 g of water and neutralised by adding 4 g of glacial acetic acid. After cooling, the precipitate is filtered off, washed with water and dried. The same dyestuff as in Example 1a) is obtained in a yield of 9.9 g, corresponding to 80% of theory.

f. Using 1 g of the dyestuff from Example 1a), which previously has been finely dispersed in the presence of dispersing agents, 100 g of polyethylene terephthalate fibres are dyed in 4 l of water, in the presence of 15 g of o-cresotic acid methyl ester as the carrier, for 2 hours at 100° C and pH 4.5. A brilliant yellowish-tinged pink dyeing is obtained which is distinguished by very good build-up and high fastness to washing, thermofixing, abrasion and light. A similar dyeing is obtained when the polyester fibres used are those obtained from 1,4-bis-(hydroxymethyl)-cyclohexane and terephthalic acid.

g. Using 1 g of the dyestuff mentioned in Example 1a), which previously has been finely dispersed using the customary auxiliaries, 100 g of polyester fibres (polyethylene terephthalate) are dyed in 3 l of water for 1 hour at 125°-130° C under pressure. A clear, deep pink dyeing of good fastness properties is obtained.

h. Using 1 g of the dyestuff mentioned in Example 1a), which previously has been finely dispersed according to the customary methods, 100 g of polyamide fabric are dyed in 4 l of water for 1 hour at 100° C. The fabric is then rinsed warm and cold and dried. A clear pink dyeing of very good fastness to washing and light is obtained. Polyurethane fibres can be used in place of polyamide fibres with equal success.

i. A dyebath is prepared using 1 g of the above dyestuff, which previously has been finely dispersed using the auxiliaries customary for this purpose, 6 g of fatty alcohol sulphonate and 3 l of water and 100 g of cellulose triacete fibres are dyed in this bath for 1 hour at 100° C. A yellowish-tinged red dyeing of very good fastness to washing, thermofixing, abrasion and light is obtained.

k. 20 g of cellulose 2½-acetate fibres are dyed for 1 hour at 75° C in a liquor consisting of 600 ml of water, 1 g of Marseille soap and 0.2 g of the dyestuff mentioned in Example 1a), which has been finely dispersed. A brilliant pink dyeing of good fastness to abrasion, light and washing is obtained.

l. A fabric of polyester fibres (polyethylene terephthalate) is impregnated on a padder with a liquor which contains, per litre, 20 g of the dyestuff of the above structure, which previously has been finely dispersed in the presence of dispersing agents. The fabric is squeezed off to an increase in weight of 70% and dried in a tensionless nozzle type drier or drying cabinet at 80°–120° C. The fabric is then treated in a stenter frame or nozzle hot-flue with hot air for about 45 seconds at 190°–220° C, after which it is rinsed, possibly subjected to a reductive after-treatment, washed, rinsed and dried. The reductive after-treatment in order to remove amounts of dyestuff adhering to the surface of the fibres can be carried out by introducing the fabric at 25° C into a liquor which contains, per litre, 3–5 cm³ of 38° Be strength sodium hydroxide solution and 1–2 g of sodium dithionite (concentrated), heating to 70° C in the course of about 15 minutes and leaving it for a further 10 minutes at 70° C. The fabric is then rinsed hot, acidified with 2–3 cm³/l of 85% strength formic acid at 50° C, rinsed and dried. A brilliant pink dyeing is obtained, which is distinguished by its high dyestuff yield, its very good build-up and by outstanding fastness properties, especially very good fastness to thermofixing, washing, abrasion and light.

A similar dyeing is obtained when polyester fibres obtained from 1,4-bis-(hydroxymethyl)-cyclohexane and terephthalic acid are used in place of polyethylene terephthalate fibres. A brilliant pink dyeing is obtained in a similar manner when, in place of polyethylene terephthalate fibres, cellulose triacetate fibres are employed and the thermosol treatment is carried out at 215° C, or when polyamide or polyurethane fibres are used and the thermosol treatment is carried out at 190°–215° C.

m. A pre-cleaned and thermofixed fabric of polyethylene terephthalate is printed with a paste consisting of the following components: 20 g of the dyestuff mentioned in Example 1a), which has been finely dispersed, 520 g of water, 450 g of crystal gum 1:2 and 10 g of cresotic acid methyl ester.

An alginate thickener can also be used in place of crystal gum. In order to fix the dyestuff, the printed and dried goods are treated with hot air at 200° C or are passed at 190°–200° C over a high capacity stenter frame or through a condensing apparatus. The period of action is 30–60 seconds. The resulting fixed print is then rinsed cold, saponified for about 10 minutes at 70°–80° C with 1–2 g/l of anionic washing agent, rinsed, first hot and then cold, and dried. A clear print of very good fastness to light and sublimation is obtained.

A brilliant pink print is obtained in a similar manner when cellulose triacetate, polyamide or polyurethane fibres are employed in place of polyethylene terephthalate fibres.

EXAMPLE 2

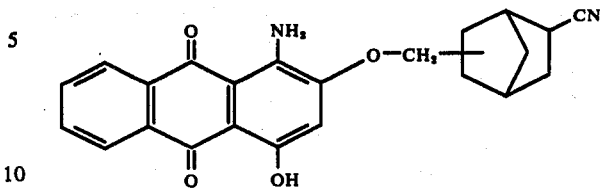

a. 91.2 g of a mixture of 5- and 6-hydroxymethyl-2-cyanobicyclo[2.2.1]heptane, such as is obtained from the hydro-formylation of 2-cyano-bicyclo[2.2.1]hept-5-ene and subsequent or simultaneous hydrogenation of the formyl group, and 67.8 g of ε-caprolactam are stirred at 100° C until a clear melt has formed. 24.9 g of 1-amino-2-phenoxy-4-hydroxy-anthraquinone and 7.8 g of potassium carbonate are introduced into this melt and the mixture is heated, whilst stirring, to 140° C until all of the starting material has been converted (about 5 hours). The reaction mixture is diluted at 60° C with 180 ccs of methanol. After cooling to room temperature, the red crystals which have precipitated are filtered off, washed with methanol and water and dried.

Yield: 24.1 g, corresponding to 82%.

b. When the procedure is as in Example 2a), but 51 g of pyrrolidone-(2) are used in place of ε-caprolactam, 22.8 g, corresponding to 78% of theory, of the same dyestuff are obtained.

c. If, in Example 2a), 59.4 g of N-methyl-pyrrolidone-(2) are used in place of ε-caprolactam, 23.5 g, corresponding to 80% of theory, of the same dyestuff are obtained.

d. If, in Example 2a), 72 g of sulpholane are used in place of ε-caprolactum, 21.4 g, corresponding to 73% of theory, of the same dyestuff are obtained.

e. If the procedure is according to Example 2a), but 46.8 g of dimethylsulphoxide are used in place of ε-caprolactam, 22.2 g corresponding to 76% of theory, of the same dyestuff are obtained. This dyestuff is also obtained when the reaction is carried out in pyridine as the solvent.

f. 50 g of a mixture of 5- and 6-hydroxymethyl-2-cyanobicyclo[2.2.1]heptane, 8.3 g of 1-amino-2-phenoxy-4-hydroxy-anthraquinone and 2.6 g of potassium carbonate are heated at 160° C until no further starting material can be detected by thin layer chromatography.

The reaction mixture is then diluted, at 60° C, with 50 ccs of methanol and, after cooling to room temperature, the crystals which have precipitated are separated off. They are washed with methanol and water and dried. The dyestuff obtained is identical to that prepared according to Example 2a).

Yield: 7.4 g, corresponding to 76% of theory.

g. 50 g of a mixture of 5- and 6-hydroxymethyl-2-cyanobicyclo[2.2.1]heptane and 2.1 g of potassium hydroxide are subjected to incipient distillation in vacuo. 8.3 g of 1-amino-2-phenoxy-4-hydroxy-anthraquinone are added, the mixture is heated at 160° C until all of the starting material has been converted, the product is precipitated at 60° C with 50 ccs of methanol and, after working up as before, 7.6 g, correspondng to 78% of theory, of red crystals are obtained.

The dyestuff is identical to that prepared according to Example 2a).

Using this dyestuff, according to the instructions in Example 1f) or 1g), a deep, clear pink dyeing of very good fastness properties is obtained on polyester fibres (poly-ethylene terephthalate).

h. A pre-cleaned and thermofixed fabric of polyethylene terephthalate is printed with a paste consisting of the following components: 20 g of the dyestuff obtained according to Example 2a), which has been finely dispersed, 520 g of water, 450 g of crystal gum 1:2 and 10 g of cresotic acid methyl ester.

An alginate thickener can also be used in place of crystal gum. In order to fix the dyestuff, the printed and dried goods are treated at 200° C with hot air or are passed at 190°–200° C over a high capacity stenter frame or through a condensing apparatus. The period of action is 30–60 seconds. The resulting fixed print is then rinsed cold, saponified at 70°–80° C with 1-2 g/l of anionic washing for about 10 minutes, rinsed, first hot and then cold, and dried. A clear print of very good fastness to light and sublimation is obtained.

A brilliant pink print is obtained in a similar manner when cellulose triacetate, polyamide or polyurethane fibres are employed in place of polyethylene terephthalate fibres.

EXAMPLE 3

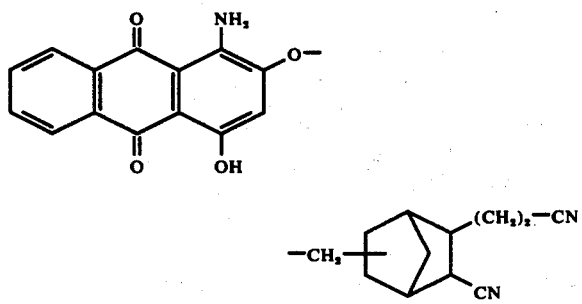

205 g of a mixture of 5- and 6-hyroxymethyl-2cyanoethyl-3-cyano-bicyclo[2.2.1]heptane, such as is obtained from the hydroformylation of 2-cyanoethyl-3-cyano-bicyclo[2.2.1]-hept-5-ene and subsequent hydrogenation of the formyl group, and 113 g of ε-caprolactam are stirred at 100° C until a clear melt has formed. 41.5 g of 1-amino-2-phenoxy-4-hydroxy-anthraquinone and 13 g of potassium carbonate are introduced into this melt and the mixture is heated at 140° C, whilst stirring, until all of the starting material has been converted (about 4 hours). The reaction mixture is diluted, at 60° C, with 500 ccs of methanol and the crystals which have precipitated are filtered off at room temperature, washed with methanol and water and dried.

Yield: 42.5 g, corresponding to 76% of theory.

The dyestuff dyes polyethylene terephthalate fibres, for example according to the process mentioned in Example 1f), and polyamide fibres, for example according to the process described under 1h), in brilliant yellowish-tinged pink shades.

An equivalent red dyeing is obtained analogously on a fabric of polycyclohexane-dimethylene terephthalate fibres.

EXAMPLE 4

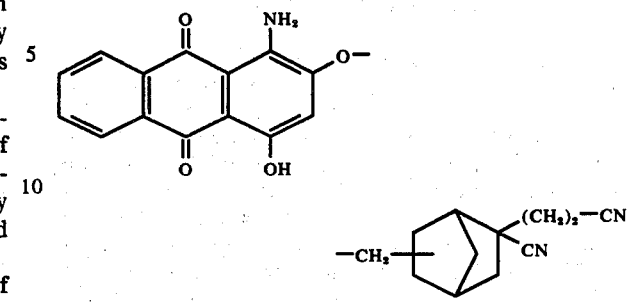

196 g of a mixture of 5- and 6-hydroxymethyl-2cyanoethyl-2-cyano-bicyclo[2.2.1]heptane and 113 g of ε-caprolactam are heated until a clear melt is obtained (about 100° C) and 41.5 g of 1-amino-2-phenoxy-4-hydroxy-anthraquinone and 13 g of potassium carbonate are introduced. The mixture is stirred at 140° C until all of the starting material has been converted (about 3 hours) and then diluted at 60° C with 300 ccs of methanol and the crystals which have precipitated are filtered off at room temperature, washed with methanol and water and dried.

Yield: 39.4 g, corresponding to 71% of theory.

The dyestuff dyes polyester and polyamide fibres in brilliant pink shades.

The mixture of 5- and 6-hydroxymethyl-2-cyanoethyl-2-cyano-bicyclo[2.2.1]heptane, which was used, was prepared as follows: 60 g of a mixture of 5- and 6-formyl-2-cyanoethyl-2-cyano-bicyclo[2.2.1]heptane, which has been obtained by hydroformylation of 2-cyanoethyl-2-cyano-bicyclo[2.2.1]hept-5-ene at 150° and 200 bars of CO/H₂ in a molar ratio of 1:1, using Rh₂O₃ as the catalyst, are dissolved in 300 ccs of tetrahydrofurane and hydrogenated, in the presence of 10g of a commercially available copper chromite catalyst, in 2.5 hours at 125° C and 100 bars hydrogen pressure.

Distillation of the reaction mixture gives 47 g of 5- and 6-hydroxymethyl-2-cyanoethyl-2-cyano-bicyclo[2.2.1]-heptane of boiling point 210 to 220° C at 0.2 mm Hg.

EXAMPLE 5

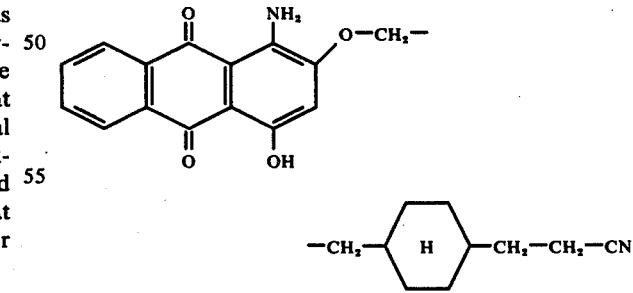

a. 181 g of 1-hydroxyethyl-4-cyanoethyl-cyclohexane and 113 g of ε-caprolactam are heated (about 100° C) to give a clear melt. 41.5 g of 1-amino-2-phenoxy-4-hydroxy-anthraquinone and 13 g of potassium carbonate are introduced into the melt and the mixture is stirred at 140° C until all of the starting material has been converted. The reaction mixture is then diluted at 60° C with 300 ccs of methanol. The crystals which have precipitated are filtered off at room temperature, washed with methanol and water and dried.

Yield: 39.9 g, corresponding to 76% of theory, of red crystals.

b. 100 g of 1-hydroxyethyl-4-cyanoethyl-cyclohexane, 16.6 g of 1-amino-2-phenoxy-4-hydroxy-anthraquinone and 5.2 g of potassium carbonate are heated at 160° C until no further starting material can be detected by thin layer chromatography. The reaction mixture is then diluted at 60° C with 100 ccs of methanol, and, after cooling to room temperature, the crystals which have separated out are filtered off, washed with methanol and water and dried. The dyestuff obtained is identical to that prepared according to Example 5a).

Yield 17.1 g, corresponding to 81% of theory.

c. 21.4 g of 1-amino-2-[2-(4-chloroethyl-cyclohexyl)-ethoxy]-4-hydroxy-anthraquinone, which has been prepared, for example according to the instruction in British Pat. No. 1,195,151 of 17.5.1968, Example 1, 3.1 g of sodium cyanide and 100 ccs of triethylene glycol are heated slowly to 140° C, whilst stirring, and kept at this temperature until all of the starting material has been converted. The reaction mixture is then diluted at 60° C with 50 ccs of methanol and allowed to cool to room temperature and the precipitate is filtered off, washed with methanol and water and dried at 60° C.

Yield: 16.4 g, corresponding 78% of theory, of the product, which is identical to the dyestuff of Example 5a).

If, in place of triethylene glycol methyl ethyl ketone, dimethylformamide, dimethylsulphoxide, N-methyl-pyrrolidone-(2), sulpholane, butanol or glycol monoethyl ether is used, the same dyestuff is obtained in similar yield.

The dyestuff is also obtained in good yield when potassium cyanide, copper-I cyanide or zinc cyanide is used in place of sodium cyanide.

d. 1 g of the above dyestuff, which previously has been finely dispersed in the presence of dispersing agents, is dispersed in 4 l water. 100 g of polyethylene terephthalate fibres are dyed in the resulting dyebath, in the presence of 15 g of o-cresotic acid methyl ester as the carrier, for 120 minutes at the boil. A brilliant, clear, yellowish-tinged pink dyeing of very good fastness to light, wet processing and sublimation is obtained.

A similar dyeing is obtained when polyester fibres obtained from 1,4-bis-(hydroxymethyl)-cyclohexane and terephthalic acid are used in place of polyethylene terephthalate fibres.

EXAMPLES 6–77

The anthraquinone compounds listed in Table 1, which give the indicated shades on woven fabrics or knitted fabrics of polyester, triacetate, polyamide, polyurethane or polyolefine fibres, are prepared analogously to the description in Examples 1–5.

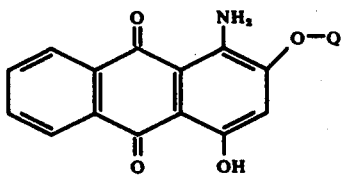

| Example No. | Q | Colour shade |
|---|---|---|
| 6 | −CH$_2$−(cyclopentyl-H)−CN | pink |
| 7 | −CH$_2$−(cyclopentyl-H)−CH$_2$−CN | pink |
| 8 | −CH$_2$−(cyclopentyl-H)−CH$_2$−CH$_2$−CN | yellowish-tinged pink |
| 9 | −CH$_2$−(cyclopentyl-H, CH$_3$)−CN | yellowish-tinged pink |
| 10 | −CH$_2$−CH$_2$−(cyclopentyl-H)−CN | pink |
| 11 | −(CH$_2$)$_2$−(cyclopentyl-H, CN)−CN | pink |

-continued

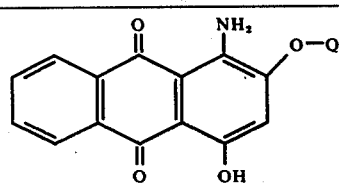

| Example No. | Q | Colour shade |
|---|---|---|
| 12 | —CH₂—[cyclohexyl: H, CN] | pink |
| 13 | —CH₂—[cyclohexyl: H, CN] | pink |
| 14 | —CH₂—[cyclohexyl: CN, H] | yellowish-tinged pink |
| 15 | —CH₂—[cyclohexyl: H, CH₂—CN] | pink |
| 16 | —CH₂—CH₂—[cyclohexyl: H, CN] | pink |
| 17 | —CH₂—CH₂—[cyclohexyl: H, CN] | pink |
| 18 | —(CH₂)₃—[cyclohexyl: H, CN] | pink |
| 19 | —CH₂—CH₂—[cyclohexyl: H, CH₂—CN] | pink |
| 20 | —CH₂—[cyclohexyl: H, CH₂—CH₂—CN] | yellowish-tinged pink |
| 21 | —CH₂—CH₂—[cyclohexyl: H, CH₂—CH₂—CN] | pink |
| 22 | —(CH₂)₃—[cyclohexyl: H, (CH₂)₃—CN] | yellowish-tinged pink |
| 23 | —(CH₂)₄—[cyclohexyl: H, CN] | pink |
| 24 | —CH₂—[cyclohexyl: H, (CH₂)₄—CN] | pink |
| 25 | —CH₂—[cyclohexyl: CN, H, CH₃] | pink |

-continued

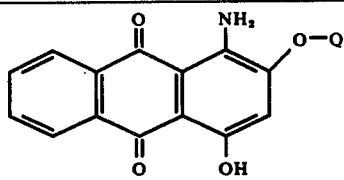

| Example No. | Q | Colour shade |
|---|---|---|
| 26 | —CH₂—(cyclohexyl: 2-CH₃, H, 4-CN) | yellowish-tinged pink |
| 27 | —CH₂—(cyclohexyl: 2-CH₃, H, 4-CN, 6-CH₃) | pink |
| 28 | —CH₂—(cyclohexyl: H, 4-CH₃, 4-CN) | yellowish-tinged pink |
| 29 | —CH₂—(cyclohexyl: 2-C₂H₅, H, 4-CN) | pink |
| 30 | —CH₂—(cyclohexyl: 3-CN, H, 5-C₃H₇) | pink |
| 31 | —CH₂—(cyclohexyl: 2-CN, 3-CH₃, H, 4-CN, 5-CH₃) | pink |
| 32 | —CH₂—(cyclohexyl: 3-CN, H, 4-CN) | pink |
| 33 | —CH₂—(cyclohexyl: 3-CH₂—CN, H, 4-CH₃) | pink |
| 34 | —CH₂—(cyclohexyl: 3-CH₂—CN, H, 4-CH₂—CN) | pink |
| 35 | —CH₂—(cyclohexyl: 3-CH₂—CN, H, 4-CN) | pink |
| 36 | —CH₂—(cyclohexyl: 3-Cl, H, 4-CN) | pink |
| 37 | —CH₂—(cyclohexyl: 3-CH₂—CH₂—CN, H, 4-CN) | pink |

-continued

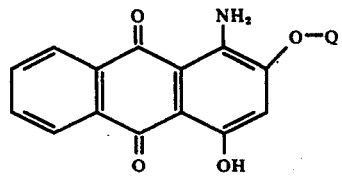

| Example No. | Q | Colour shade |
|---|---|---|
| 38 | -CH₂-[cyclohexyl with H, CN, CH₂-CH₂-CN] | pink |
| 39 | -CH₂-[cyclohexyl with H, CN, CH₂-CH₂-CN] | pink |
| 40 | -(CH₂)₂-[cyclohexyl with H, CH₃, CN] | pink |
| 41 | -CH₂-[bicyclic-CN] | yellowish-tinged pink |
| 42 | -CH₂-[bicyclic-CN] | yellowish-tinged pink |
| 43 | -CH₂-[bicyclic-CH₂-CN] | yellowish-tinged pink |
| 44 | -CH₂-[bicyclic-CH₂-CN] | yellowish-tinged pink |
| 45 | -CH₂-[bicyclic-CH₂-CH₂-CN] | pink |
| 46 | -CH₂-CH₂-[bicyclic-CN] | pink |
| 47 | -CH₂-CH₂-[bicyclic-CN] | pink |
| 48 | -CH₂-CH₂-[bicyclic-CH₂-CN] | pink |
| 49 | -CH₂-CH₂-[bicyclic-CH₂-CH₂-CN] | pink |
| 50 | -(CH₂)₃-[bicyclic-CN] | yellowish-tinged pink |

-continued

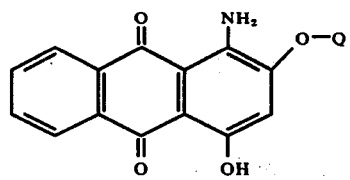

| Example No. | Q | Colour shade |
|---|---|---|
| 51 | —(CH₂)₃—[bicyclic]—(CH₂)₃—CN | yellowish-tinged pink |
| 52 | —(CH₂)₄—[bicyclic]—CN | yellowish-tinged pink |
| 53 | —CH₂—[bicyclic with CH₃ and CN] | yellowish-tinged pink |
| 54 | —CH₂—[bicyclic with CH₃ and CN] | yellowish-tinged pink |
| 55 | —CH₂—[bicyclic with CN and CH₃] | yellowish-tinged pink |
| 56 | —CH₂—[bicyclic with CN, CN] | pink |
| 57 | —CH₂—[bicyclic with CH₂—CN, CH₂—CN] | pink |
| 58 | —CH₂—[bicyclic with CN, CH₂—CH₂—CN] | pink |
| 59 | —CH₂—[bicyclic with CH₂—CH₂—CN, CN] | pink |
| 60 | —CH₂—[bicyclic with CH₂—CH₂—CN, CN] | pink |
| 61 | —CH₂—[bicyclic—CN] | yellowish-tinged pink |
| 62 | —CH₂—[bicyclic—CN] | yellowish-tinged pink |

-continued

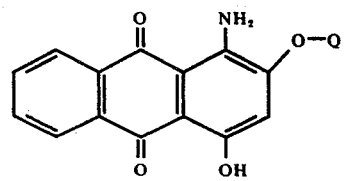

| Example No. | Q | Colour shade |
|---|---|---|
| 63 | —CH₂—[bicyclo]—CH₂—CN | yellowish-tinged pink |
| 64 | —CH₂—[bicyclo]—CH₂—CH₂—CN | yellowish-tinged pink |
| 65 | —CH₂—CH₂—[bicyclo]—CN | pink |
| 66 | —CH₂—CH₂—[bicyclo]—CH₂—CH₂—CN | pink |
| 67 | —(CH₂)₃—[bicyclo]—CN | yellowish-tinged pink |
| 68 | —CH₂—[bicyclo with CH₃]—CN | pink |
| 69 | —CH₂—[bicyclo with CN]—CN | pink |
| 70 | —CH₂—[bicyclo with CH₂—CN]—CH₂—CN | pink |
| 71 | —CH₂—[bicyclo with CN]—CH₂—CH₂—CN | pink |
| 72 | —CH₂—[bicyclo with CN]—CH₂—CH₂—CN | pink |
| 73 | —CH₂—[tricyclo]—CN | pink |
| 74 | —CH₂—[tricyclo]—CH₂—CN | pink |

-continued

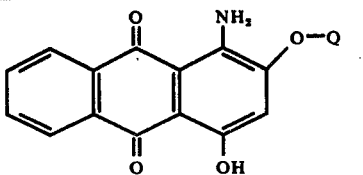

| Example No. | Q | Colour shade |
|---|---|---|
| 75 | (tricyclic structure with —CH₂ and CH₂—CN, CN substituents) | pink |
| 76 | (tricyclic structure with —CH₂ and CN substituents) | pink |
| 77 | (bicyclic structure with —CH₂ and CN, CN substituents) | pink |

Example 78

(anthraquinone structure with Cl, NH₂, O—CH₂—cyclohexyl-CN, OH substituents)

a. 139 g of a mixture of 3- and 4-hydroxymethyl-hexahydrobenzonitrile and 99 g of N-methyl-pyrrolidone-(2) are treated at 100° C with 45.7 g of 1-amino-2-phenoxy-4-hydroxy-6-chloroanthraquinone and 13 g of potassium carbonate and the mixture is stirred at 140° C until no further starting material can be detected by chromatography. The reaction mixture is diluted at 60° C with 300 ccs of methanol and the crystals which have precipitated are filtered off at room temperature, washed with methanol and water and dried.

Yield: 36 g, corresponding to 70% of theory. b. 100 g of a mixture of 3- and 4-hydroxymethyl-hexahydrobenzonitrile, 18.3 g of 1-amino-2-phenoxy-4-hydroxy-6-chloroanthraquinone and 5.2 g of potassium carbonate are heated at 160° until no further starting material can be detected by thin layer chromatography. The mixture is then diluted at 60° with 100 ccs of methanol and, after cooling to room temperature, the crystals which have separated out are filtered off, washed with methanol and water and dried. The resulting dyestuff is identical to that of Example 78a).

Yield: 16.1 g, corresponding to 78% of theory. c. 1 g of the dyestuff of Example 78a), which has been finely dispersed in the presence of dispersing agents, is dispersed in 4 litres of water. 100 g of polyester fibres (polyethylene terephthalate) are dyed in the resulting dyebath, in the presence of 15 g of o-cresotic acid methyl ester as the carrier, for 120 minutes at the boil. A brilliant, clear red dyeing of good fastness to light, wet processing and sublimation is obtained.

An equivalent red dyeing is obtained analogously on a fabric of polycyclohexane-dimethylene terephthalate fibres.

Similar dyeings are also obtained with this dyestuff on a polyamide fabric according to the process of Example 1h) or on cellulose triacetate fibres according to Example 1i).

EXAMPLES 79-96

The anthraquinone compounds listed in Table 2, which give the indicated shades on woven fabrics or knitted fabrics of polyester, triacetate, polyamide, polyurethane or polyolefine fibres, are prepared analogously to the description in Examples 1-5 and 78.

Table 2
| Example No. | Q | $Z_1$ | $Z_2$ | Colour shade |
|---|---|---|---|---|
| 79 | 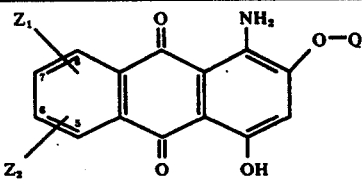 | 5-Cl | H | red |
| 80 | 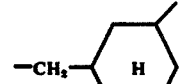 | 5-Cl | H | red |
| 81 | 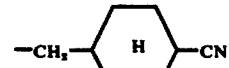 | 6-Cl | H | red |
| 82 | 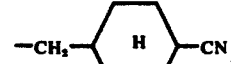 | 6-Cl | H | red |
| 83 | 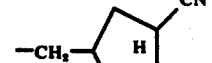 | 7-Cl | H | red |
| 84 | 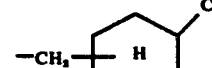 | 7-Cl | H | red |
| 85 |  | 8-Cl | H | red |
| 86 |  | 6-Cl | 7-Cl | red |
| 87 |  | 6-Cl | 7-Cl | red |
| 88 | 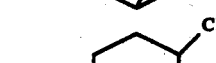 | 5-F | H | red |
| 89 |  | 5-F | H | red |
| 90 | 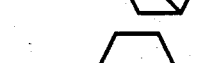 | 6-F | H | red |
| 91 | 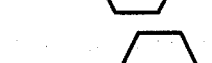 | 6-F | H | red |
| 92 | 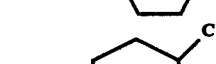 | 7-F | H | red |

Table 2-continued

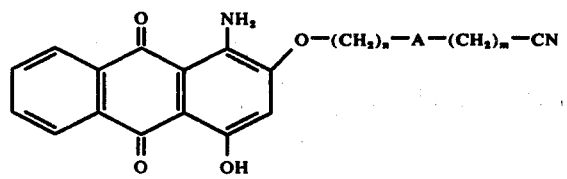

| Example No. | Q | $Z_1$ | $Z_2$ | Colour shade |
|---|---|---|---|---|
| 93 | —CH₂—⟨cyclohexyl, H⟩—CH₂—CH₂—CN | 7-F | H | red |
| 94 | —CH₂—⟨norbornyl⟩—CN | 8-F | H | red |
| 95 | —CH₂—⟨cyclohexyl, H⟩—CN | 6-F | 7-F | red |
| 96 | —CH₂—⟨norbornyl⟩—CN | 6-F | 7-F | red |

We claim:

1. Anthraquinone dyestuff which is water-insoluble and has the formula

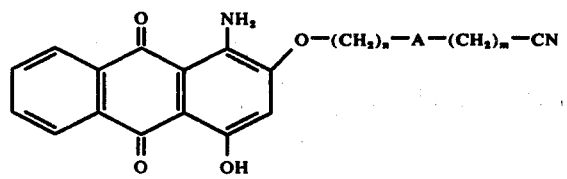

wherein
A is cycloalkylene or cycloalkylene substituted by chlorine $C_1$-$C_3$-alkyl or cyano; and
n and m are numbers from 0 to 4.

2. Anthraquinone dyestuffs, which are insoluble in water, according to claim 1, characterised in that A represents a 5-membered to 14-membered monocyclic to tetracyclic cycloalkylene group, which can be substituted by $C_1$ to $C_3$-alkyl, chlorine or cyano.

3. Anthraquinone dyestuffs, which are insoluble in water, according to claim 1, characterised in that A represents a 5-membered to 8-membered monocyclic or bicyclic cycloalkylene group, which can be substituted by $C_1$ to $C_3$-alkyl, chlorine or cyano.

4. Anthraquinone dyestuff according to claim 1 of the formula

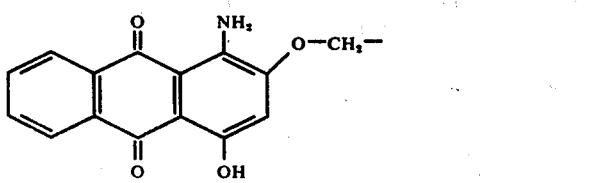
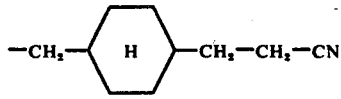

5. Anthraquinone dyestuff of claim 1, wherein n is 1 or 2 and m is 0, 1, or 2.

6. Anthraquinone dyestuff according to claim 1 of the formula

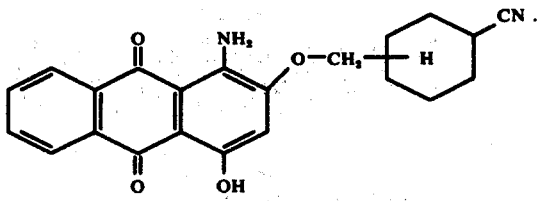

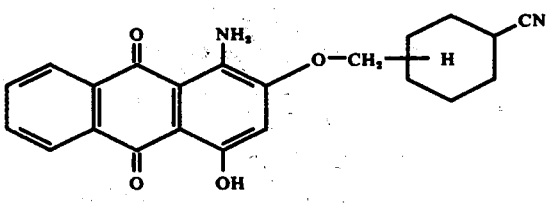

7. Anthraquinone dyestuff according to claim 1 of the formula

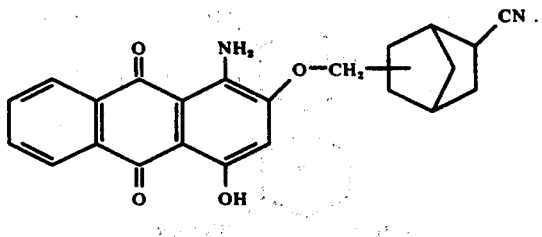

8. Anthraquinone dyestuff according to claim 1 of the formula
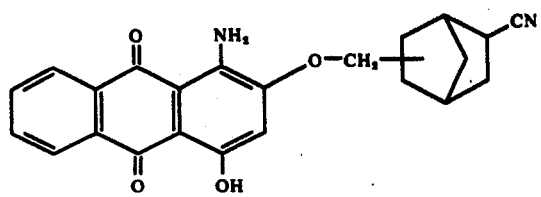
9. Anthraquinone dyestuff according to claim 1 of the formula
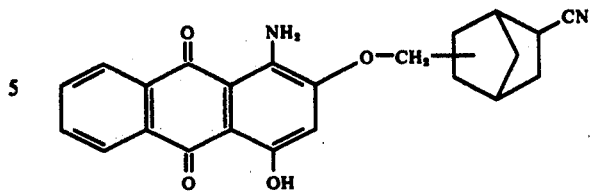
10. Anthraquinone dyestuff according to claim 1 of the formula
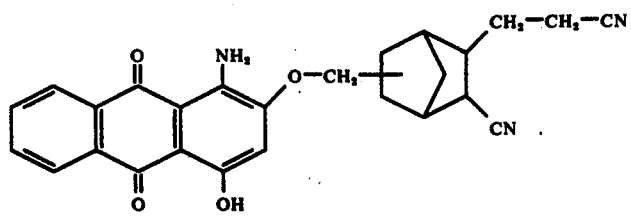
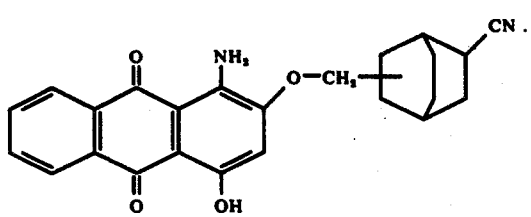
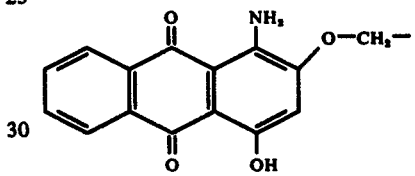
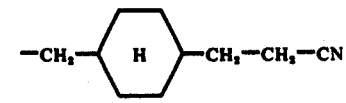
* * * * *